March 24, 1953 A. L. W. WILLIAMS 2,632,634
ELECTROACOUSTIC DEVICE
Filed Sept. 23, 1950 5 Sheets-Sheet 1

INVENTOR.
ALFRED L.W. WILLIAMS
BY Harries A. Mumma Jr.
ATTORNEY

March 24, 1953 A. L. W. WILLIAMS 2,632,634
ELECTROACOUSTIC DEVICE
Filed Sept. 23, 1950 5 Sheets-Sheet 2

INVENTOR.
ALFRED L.W. WILLIAMS
BY
Harries A. Mumma Jr.
ATTORNEY

March 24, 1953

A. L. W. WILLIAMS 2,632,634

ELECTROACOUSTIC DEVICE

Filed Sept. 23, 1950

*INVENTOR.*
ALFRED L. W. WILLIAMS
BY
Harries A. Mumma Jr.

ATTORNEY

Patented Mar. 24, 1953

2,632,634

UNITED STATES PATENT OFFICE 2,632,634

ELECTROACOUSTIC DEVICE

Alfred L. W. Williams, Cleveland Heights, Ohio, assignor to The Brush Development Company, Cleveland, Ohio, a corporation of Ohio Application September 23, 1950, Serial No. 186,370

14 Claims. (Cl. 259—1)

This invention relates to an improved electroacoustic device, and more particularly to an electromechanical device for transducing from electrical energy to acoustic energy propagating in a fluid acoustic medium.

One form of the electro-acoustic device with which this invention is concerned is a focused acoustic treatment device, and in a more specific form the invention involves such a device of the type in which energy is generated by an electromechanical transducer having a radiating element or elements arranged in a concave surface, this transducer being associated with an acoustic medium for concentrating the radiated energy at a focal region determined by the shape of the concave surface.

This application is a continuation-in-part of my application for Letters Patent of the United States Serial No. 88,865, filed April 21, 1949, and assigned to the same assignee as the present invention, which issued on August 21, 1951, as Patent No. 2,565,159.

Numerous proposals have been made during the past several decades for hastening, retarding, or otherwise altering the course of physical, chemical, or biological processes by the use of acoustic energy of audible or inaudible frequencies. Devices of this character will be referred to generally in this application and in the appended claims as acoustic treatment devices, it being understood that such devices may utilize frequencies below, within, or above the audible range. Ultrasonic frequencies customarily are used for this purpose.

Two basic problems arise with such devices, first, the problem of obtaining sufficient useful power in the form of acoustic or ultrasonic energy propagated through an acoustic medium, and second, the problem of applying such energy efficiently to large quantities of the material to be treated.

One successful answer to the first problem has been found in focused electro-acoustic transducers using materials having high electromechanical responses and having physical properties permitting easy production of the desired shapes and favoring their use with liquid acoustic media such as water and various oils. A focused electromechanical device of this type is described and claimed in the aforesaid copending application Serial No. 88,865, now Patent No. 2,565,159. This focused electromechanical device comprises a concave body of electromechanically responsive polycrystalline dielectric material, electroded on the concave surface and on the opposite surface, and electrically polarized to provide a major electromechanical response in a thickness mode of motion. Means are provided for applying electrical or mechanical energy and for utilizing the resulting mechanical or electrical energy with translation of acoustic energy at the focal region. A ceramic body of barium titanate material having a concave surface of generally spherical or cylindrical shape has been found particularly satisfactory for this device.

While the device just discussed has produced remarkably fine results in the field of treatment by acoustic energy, there are limitations in the practical size of a single body of titanate or other electromechanically responsive material. Thus the total radiating area focused on the focal region of a portion of a spherical surface, or the total radiating area per unit length focused on the axial region of a cylindrical radiating surface, is limited if the radiating body is made in one piece. Attempts to utilize a number of ultrasonic radiating elements individually having plane or concave radiating surfaces may be unsuccessful because of undesirable mechanical resonances set up in the radiating elements themselves or in the structures upon which they are mounted. The mounting structures have been found to introduce often unpredictable variations in the resonant frequencies of the individual elements affixed to the structures. Resonances in undesired mechanical modes also may be excited even when resonant operation in another mechanical mode is to be obtained. Another factor which sometimes limits the usefulness of large electromechanical transducers is localized heating due to dielectric losses.

Further difficulties also arise frequently when it is attempted to subject large quantities of material to the ultrasonic energy in a relatively small focal region of the treatment device. The aforementioned copending application discloses for this purpose a small central tube arranged axially within a cylindrical radiator, so that liquid to be treated may be passed through the central tube. Alternatively solid objects may be carried for treatment along the axis of a cylindrically shaped liquid-filled transducer by mechanical conveyor means. However, it may be desired to use spherically shaped radiating surfaces for focusing the maximum amount of ultrasonic power on a region of a given size. The second problem, mentioned above, again arises of arranging the flow of the material to be treated in such a manner as to submit each particle of a material to the high intensity energy in the focal region for the minimum period of time necessary to obtain the desired results of the treatment. One answer, disclosed in the aforementioned copending application, is an acoustic lens or mirror for projecting the focused energy along an elongated treatment path having a much larger volume than the focal region. However, even this expedient may result in some cases in undesirable dissipation of the available energy, leading to inefficient use of the apparatus.

It is an object of this invention, therefore, to provide a new and improved electro-acoustic device which avoids one or more of the limitations of prior such devices.

It is also an object of the invention to provide a new and improved electro-acoustic device arranged for the efficient generation of acoustic energy and application thereof to material to be treated.

It is a further object of the invention to provide a new and improved electro-acoustic device for the rapid and continuous treatment of large quantities of material with acoustic energy of high intensity.

It is still another object of the invention to provide a new and improved electro-acoustic device including titanate-type ceramic electro-acoustic radiators in contact with a liquid acoustic medium arranged for applying high intensity acoustic energy to materials to be treated.

It is yet another object of the invention to provide a novel and useful device for treating fluid materials at the focal region of a generally spherically shaped electro-acoustic transducer or array.

In accordance with the invention, an electromechanical device for transducing from electrical energy to acoustic energy propagating in a fluid acoustic medium comprises a support member having a back surface and an opposed supporting surface and having numerous perforations therethrough and acoustic pressure-releasing means affixed on one side thereof to this supporting surface and having numerous openings at least partially aligned with the aforesaid perforations. The device includes a plurality of electromechanically sensitive elements, each having a back surface, affixed to the pressure-releasing means on the other side thereof, and a front surface, the front surfaces collectively forming an electro-acoustically responsive array for coupling to the fluid acoustic medium. This electromechanical transducing device further comprises means, including electrodes adjacent to each of the electromechanically sensitive elements and a system of leads connected to the electrodes, for applying electrical energy to the electro-acoustically responsive array, and the transducing device also is arranged for motion of the fluid acoustic medium from the back surface of the support member through the perforations and past the elements during operation of the device.

In accordance with another feature of the invention, a focused acoustic treatment device comprises electromechanical transducing means for directing acoustic energy from an electro-acoustically responsive radiator of sizable area toward a focal region having high acoustic energy intensity, having a relatively small effective area, and having a correspondingly small volume. This device also comprises a liquid acoustic transmission medium in contact with the radiator, a solid acoustic-energy-transmitting barrier remote from the radiator and separating the liquid medium from the focal region, and means for directing a flow of material to be treated into the device and through the focal region of small volume to subject substantially all of the material in the flow expeditiously to the acoustic energy of high intensity.

For a better understanding of the present invention, together with other and further objects thereof, reference is had to the following description taken in connection with the accompanying drawings, and its scope will be pointed out in the appended claims.

Figure 1:
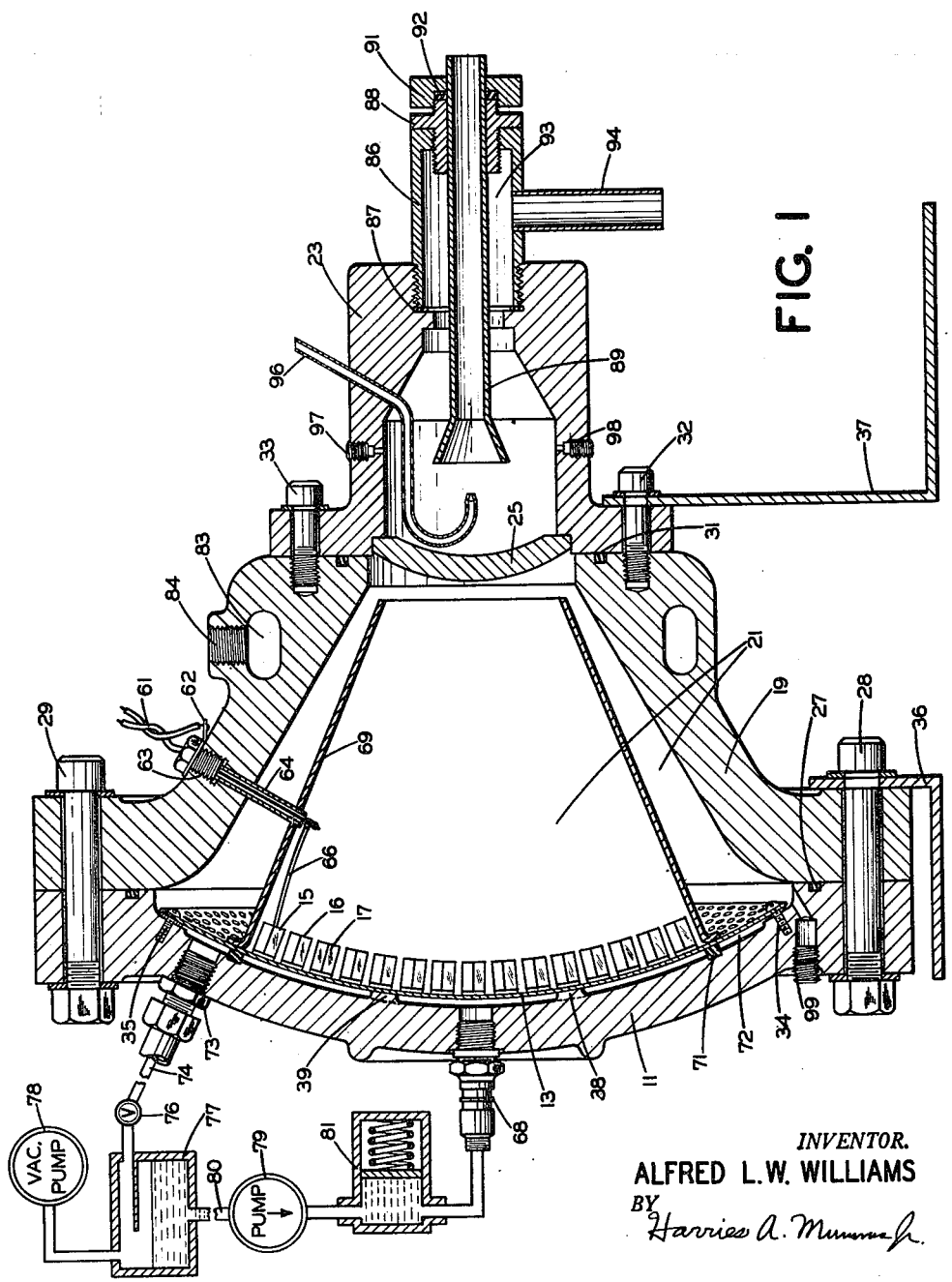
Fig. 1 is a sectional view in elevation of an electro-acoustic device in accordance with the present invention, certain portions of the hydraulic arrangements in the device being illustrated schematically.

Referring to Fig. 1 of the drawings, there is shown in sectional elevation an electromechanical device, embodying the present invention, for transducing from electrical energy to acoustic energy propagating in a fluid acoustic medium. The electromechanical device shown in Fig. 1 is a horizontally disposed focused treatment device. The major portions of this device may be identified at the outset as a base casting 11, a support member 13 for supporting a plurality of electromechanically sensitive elements 15, 16, 17, etc., a housing 19, and a hydraulic system including a fluid acoustic medium, preferably in the form of a liquid medium 21, which conveniently may be castor oil. A treatment head 23 is attached to, and forms a removable part of, the housing 19 remote from the base 11. This housing also is provided with a wall portion 25 adapted to transmit acoustic energy while confining the liquid 21 so that it cannot enter the treatment head 23.

The base 11 and housing 19 may be castings of any suitable material, such as stainless steel, brass, or aluminum. The housing 19 is shown in the shape of a truncated cone with a flange around the wider end. The base 11 is concave inwardly and has the shape of a portion of a spherical surface; a major chord across the rim of this surface conveniently subtends an angle of some 70–80°. A suitable radial dimension for this spherical surface may be about 14 inches. The spherical portion of the base 11 is surrounded by a rim having a flat surface for fastening to the flange of the housing 19. A circular indentation is provided in this rim of the base 11 for receiving a gasket ring 27, which is compressed when the flange of the housing 19 is pulled against the base by means of bolts 28, 29 to provide a seal which is tight against the liquid 21 under pressure.

The treatment head 23 is hollow and open at one end. This end is flanged to fit against a flattened surface provided at the smaller truncated end of the conical housing 19. This flattened surface also is provided with a circular indentation into which is fitted another gasket ring 31. The head 23 is secured to the smaller end of the housing 19 by means of bolts 32, 33 which compress the gasket ring 31 to provide a liquid-tight seal. The acoustic-energy-transmitting portion or acoustic window 25 is curved and also has the shape of a portion of a sphere. The window 25 is cemented into a circular recess provided in the walls of the head 23 at the open end thereof with the concave surface of the window facing the interior of the head 23. The curvature of the window 25 is adjusted so that, when assembled, its center of curvature approximately coincides with the center of curvature of the spherical portion of the base 11, this center of curvature being near the center of the interior of the head 23.

The entire assembly may be maintained with the central radius of the spherical surface of the base 11 in a horizontal position by means of brackets 36 and 37 affixed to one or more of the bolts 28, 29 and 32, 33 respectively.

The support member 13 and the electromechanically sensitive elements 15, 16, etc. are parts of an electromechanical transducing means for directing acoustic energy from an electroacoustically responsive radiator of sizable area, made up of the elements 15, 16, etc., toward a focal region having high acoustic intensity, having a relatively small effective area, and having a correspondingly small volume. Such a focal region is formed within the head 23 in the neighborhood of the center of curvature of the base 11. At least the convex back surface of the support member 13 is electrically conductive. The entire support 13 suitably may be of heavy copper sheet cut into a disk and formed into a dished shape having the same center of curvature as the concave portion of the base 11. The sheet material forming the support has numerous perforations therethrough. The support 13 is affixed to the housing assembly by screws 34, 35 threaded into tapped holes in a raised portion of the base 11 just inside the outer flange of the base. The assembly of the support 13 to the base 11 is further stiffened by a number of bosses 38, 39 protruding from the concave surface of the base 11.

Figure 2:
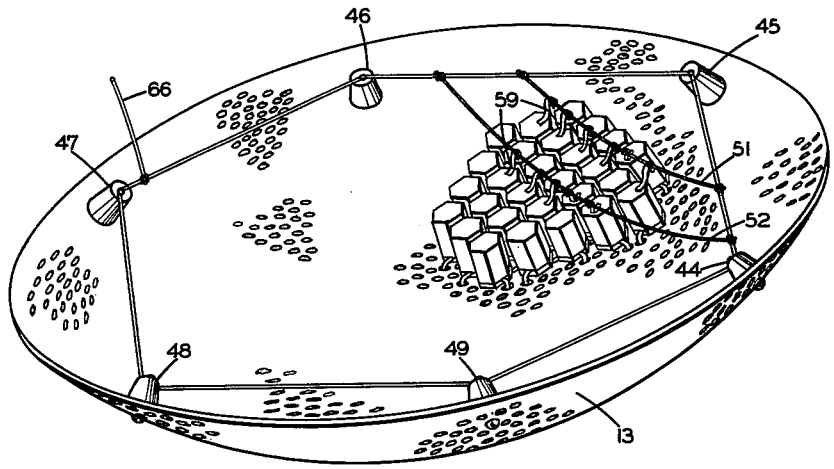
Fig. 2 is a perspective view of the electromechanical transducer arrangement incorporated in the device of Fig. 1 showing for simplicity of illustration only a small fraction of the total number of transducer elements actually present in the transducer arrangement.
Figure 3:
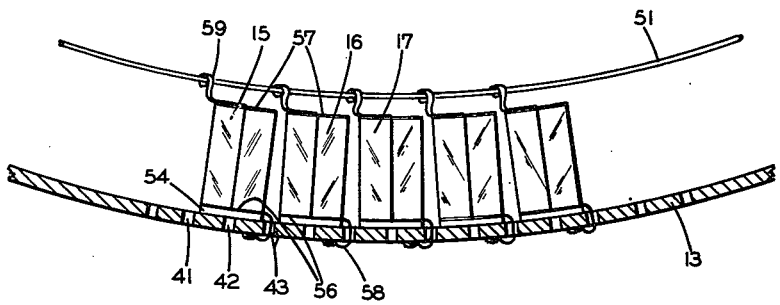
Fig. 3 is a sectional elevation of a portion of the transducer illustrated in Fig. 2, showing the construction of the transducer elements and the supporting structure.

More detailed views of the support 13 and the electromechanically responsive elements carried by it are found in Figs. 2 and 3. The supporting structure is seen in Fig. 2 to have a great many rather small perforations, and several of these perforations 41, 42, 43, etc. are seen in the sectional view of Fig. 3. It is advantageous to place a sufficient number of electromechanically responsive elements on the support 13 so that in effect the concave surface which is opposed to the convex back surface of the support member and is the supporting surface, is practically covered by these elements. However, it is convenient to leave an uncovered space near the edge of the support, and a practical comprise utilizes six standoff insulators 44—49 arranged around the support near the rim thereof at regularly spaced intervals, that is, at the corners of a regular hexagon. Rather heavy copper bus bars or wires are strung all around the support between successive insulators 44—49, and lateral wires are arranged in roughly parallel lines, but conforming to the dished shape of the support, between suitable ones of these outer bus bars. Two such lateral wires 51, 52 are shown by way of example in Fig. 2. A number of the electromechanically responsive elements also are shown in Fig. 2. These elements are hexagonal in cross section. The hexagonal shape permits easy assembly of large numbers of the elements on a curved surface with closer packing or utilization of the area than may be obtained with other shapes.

The manner of assembly of the sensitive elements 15, 16, 17, etc. on the support 13 and their electrical connections are illustrated in Fig. 3, showing elements 15, 16, 17, etc. Only a portion of one row of the elements is illustrated, the method of packing the elements on the support being illustrated for one representative portion of the transducer means by the group of elements shown in Fig. 2.

Before arranging the sensitive elements on the support 13, an acoustic pressure-releasing means is affixed on one side thereof to the concave supporting surface of the support 13. The pressure-releasing means has numerous openings at least partially aligned with the perforations in the support 13. Thus this means may be in sheet form with holes punched through the sheet for alignment with the perforation. However, at least when only small quantities are involved, it has been found more convenient to stamp out a separate pressure-releasing pad 54 for each of the sensitive elements as seen in Fig. 3. These pads may have the same hexagonal shape as the elements themselves. The acoustic pressure-releasing means serves to decouple the elements from the support member and in general may be any material or structure a sizable portion of which may suffer small compressions without exerting or transmitting substantial pressures. A suitable composition is made up of particles of cork and synthetic rubber, affording an effectively cellular structure.

With the pressure-releasing sheet or pads 54 affixed on one side thereof to the support 13, the back surface of each of the sensitive elements is affixed to the support 13 on the other side of the sheet or pads, as shown in Fig. 3. It may be convenient, when numerous separate pads 54 are used, to cement the pads to the elements first and then to cement the elements to the supporting surface. The spaces between the elements and their pads then fall into alignment more or less randomly with portions of many of the perforations in the support.

Each element has a front surface on the end or side of the element opposite from the mounted or back surface. These front surfaces collectively form an acoustically responsive array for coupling to the acoustic medium 21. As viewed in Fig. 1, this array is directed toward the acoustic-energy-transmitting wall portion 25 of the housing arrangement. More specifically, the front surfaces of the elements fall on an imaginary spherical surface having substantially the same center of curvature as the concave inner surface of the base 11 of the mounting arrangement.

The electromechanically sensitive elements 15, 16, etc. may be of any of numerous piezoelectric materials such as quartz, Rochelle salt, and ammonium dihydrogen phosphate. None of the materials just mentioned is ideal. Forming elements of a hexagonal cross-sectional shape from single-crystalline material increases the cost of the device. The quartz, although not subject to physical or chemical attack by many substances which might be used for the fluid acoustic medium, is expensive and has relatively low piezo-electric sensitivity. Many of the other piezoelectric materials having higher sensitivities are dissolved or otherwise deteriorated in contact with various fluids, and are subject to rather stringent temperature limitations. When the liquid acoustic medium is an aqueous one, water-soluble crystals would have to be covered by an impervious moisture-sealing coating.

It is preferred to fashion the elements of polycrystalline titanate-type material. Such elements may be formed inexpensively by an extrusion process when the ceramic material is in the raw state, followed by ceramic firing. The extruded hexagonal rods are cut to the desired length after firing. These elements are mechanically strong, unless very long, and are water-insoluble. A barium titanate composition is preferred. For resonant operation at a single frequency of the acoustic vibrations, the elements should be cut to a length corresponding to half of the wavelength of longitudinal compressional acoustic waves of the desired frequency in the polycrystalline material.

Means are provided, including electrodes adjacent to each of the elements and a system of leads connected to the electrodes, for applying electrical energy to the electro-acoustically responsive array formed by the elements. Electrode means are arranged adjacent to two opposed surfaces of each of the elements. Thus, as shown in Fig. 3, electrodes 56 are placed adjacent to the back surface and electrodes 57 are placed adjacent to the front surface of each of the elements. Suitable materials for the electrodes are acetylene black or finely divided silver, applied to the front and back surfaces of the elements with a bonding material which hardens during a baking operation. For connection to the portions of the electrode means adjacent to one of the two opposed electroded surfaces of each of the elements leads may be passed through the perforations in the support 13. Accordingly, lead conductors 58 are passed through the perforations and connect the conductive back surfaces of the support member 13 with the electrodes 56 adjacent to the back surfaces of the elements. Lead means now can be arranged in proximity to the front surface of the elements and interconnecting the electrodes 57 adjacent to these front surfaces. Such lead means includes wires or straps 59 connecting each electrode 57 with the nearest one of the lateral wires 51, 52, etc., or with one of the bus bars strung between the insulators 44—49, as shown in Figs. 2 and 3.

An external source of high power ultrasonic frequency electrical energy, not shown, is connected to the device by means of a suitable two conductor cable 61. One conductor of this cable is grounded to the housing 19 at a lug 62, as shown in Fig. 1. The other conductor passes through a water-tight fitting 63 and an insulating sleeve 64 to an internal bus 66, which in turn is connected to the aforementioned bus bars and lateral wires 51, 52, etc., leading to each of the front electrodes 57. The back electrodes 56 are returned to ground through their leads 58, the copper support 13, and the metallic housing 19. The arrangement of the fitting 63, the conductor 66, and the ground return path from the support 13 to the lug 62 furnishes a terminal-circuit means for applying electrical energy from the generator across the lead conductors 58 and the lead means which includes the lateral conductors 51, 52 and the leads 57, and thus across the electrodes on each of the elements.

Numerous other arrangements of the lead conductors and lead means, of course, may be used. For example, the lead means connected to the front electrodes 57 might utilize lateral conductors 51, 52 of flat or ribbon shape; if the elements are not too closely spaced, such thin conductors might be arranged to fit between the elements instead of above the radiating surface of the array. However, when the elements are of a titanate-type material, these elements ordinarily are subjected to a high unidirectional polarizing voltage before the ultrasonic frequency generator is connected to them. This polarizing treatment provides a high sensitivity and a linear response. Moreover, it is desirable in some cases, particularly after the elements have been subjected to high electric fields or high temperatures, to repolarize them while still mounted on the support 13 and wired to the leads 58 and 59. In such cases short-circuiting might occur between the back electrodes 56 and the lead conductors connected to the front electrodes 57 if these lead conductors are placed between the elements rather than above them. It may also be mentioned that it is desirable to maintain a spacing between the sides of adjacent elements of the order of 0.050 inch to prevent unwanted or destructive acoustic forces from acting on a very narrow body or thin film of liquid between the sides of adjacent elements. Such forces may arise from the lateral motion of the elements which occurs simultaneously with changes in the dimension between the back and front electrodes.

The transducing device is arranged for motion of the fluid acoustic medium 21 from the back surface of the support member 13 through the perforations 41, 42, etc. and past the elements 15, 16, etc. during operation of the device. This motion may be due merely to convection currents caused by heating of the medium 21 as a result of temperature rises occurring in the elements themselves during transducing. Such convection circulation will be mentioned hereinbelow in connection with the device illustrated in Fig. 4.

In the Fig. 1 arrangement there is provided liquid-guiding means for directing a flow of the liquid acoustic medium at a substantial velocity through the perforations, past the elements within the housing 19 toward the wall portion 25 thereof, and thence generally lateral of this wall portion to establish a continuous acoustic path through the moving liquid medium 21 between the array of sensitive elements and the acoustic-energy-transmitting wall portion 25. This liquid-guiding means includes a liquid inlet fitting 68 for admitting liquid to the space between the base 11 and the support 13, and a conical baffle 69 for guiding the liquid passing through the perforations in the direction of the wall portion 25. The baffle 69 is flanged at its wider end and affixed as by soldering or welding to the supporting surface of the support 13.

The back surface of the support 13 just behind the flange of the baffle 69 is in contact with a compressible ring-shaped gasket 71, so that the baffle and this gasket prevent any substantial flow of liquid along either the back surface or the supporting surface of the support member 13 from the central portion of the support, where the elements 15, 16, etc. are mounted to the outer portion of the support. This outer portion, however, also is perforated to permit passage of liquid from the space between the baffle 69 and the housing 19 to the annular space 72 bounded by the gasket 71, the base 11, the raised portion of the base to which the support 13 is screwed, and the outer portion of the support. Liquid can leave this annular space 72 through a fitting 73.

In addition to the liquid-guiding function of the baffle 69 and the gasket 71, the liquid-guiding means may include an external arrangement for circulating the liquid medium and returning it to the back surface of the support member 13. A hydraulic system for effecting the circulation is illustrated schematically in Fig. 1. Liquid leaving through the fitting 73 passes through piping 74 to a pressure relief valve 76 and thence into the upper portion of a chamber 77. The chamber 77 is only partially filled with the liquid, and its upper portion is connected to a vacuum pump 78 for continuously degassing the liquid medium. The degassed liquid passes from the bottom of the chamber 77 through piping 80 to a pressure pump 79, which pumps the liquid into a pressure-regulating device 81 and thence back to the fitting 68 and into the space behind the central portion of the support 13. The piping 74 and 80 is shown broken in Fig. 1 to indicate that a sufficient hydrostatic head may be maintained in vertical portions of this piping to permit flow of liquid from the evacuated chamber 77 to the inlet end of the pump 79. This pump serves as a means for maintaining the circulating liquid medium 21, acoustically coupled to the array elements, under a substantial hydrostatic pressure while between the array and the acoustic-energy-transmitting wall portion 25. If desired a fine-meshed filter also may be inserted in the circulation system to remove any small solid impurities from the liquid medium, since such impurities may serve as nuclei supporting unwanted cavitation in the liquid medium during operation of the device.

Means for controlling the temperature of the circulating liquid medium is provided in the form of an annular channel 83 in the wall of the housing 19 near the narrower end of the housing. As seen in Fig. 1, there is a cooling water inlet 84 threaded to receive a cooling water connection and communicating with one end of the channel 83. The channel makes almost a complete circle within the walls of the housing 19, and an outlet connection, not visible in Fig. 1 but similar to the inlet connection 84, also communicates with the channel not far removed from the connection 84. The channel is closed between the inlet and outlet connections to permit circulation around almost the entire periphery of the wall. It is noted that for operation under cold ambient conditions the liquid circulated through the channel 83, instead of being a coolant, might be warmer than the housing 19. In either case heat is transferred between the liquid 21 and the liquid in the channel 83 through the walls of the channel so as to exert control over the temperature of the liquid medium 21. Since the liquid 21 is in contact with the elements 15, 16, etc., the liquid 21 serves not only as an acoustic medium but also as a heat-transfer medium to prevent extremes of the temperature of the elements.

It will be seen from Fig. 1 that the liquid 21 is an acoustic transmission medium in contact with the electro-acoustically responsive radiator made up of the elements 15, 16, etc. The housing for this radiator and for the liquid medium 21 contains therein wall portion 25, which forms a solid acoustic-energy-transmitting barrier remote from the radiator and separating the liquid medium 21 from the focal region within the head 23. The pump 79 constitutes means for maintaining the liquid medium 21 under a substantial hydrostatic pressure within the housing and contiguous to one side of the barrier 25, that is, to the left side as seen in Fig. 1.

Referring now more particularly to the treatment head 23 the head includes means for directing a flow of material to be treated into the device and through the focal region of small volume within the head to subject substantially all of the material in the flow expeditiously to the acoustic energy of high intensity developed in the focal region. Ordinarily the material to be treated is a liquid material, but this liquid may contain suspended or dispersed solids, or the liquid material may be a mixture of moderately small droplets of two or more ordinarily immiscible liquids. Alternatively two liquids to be mixed may be introduced into the head through separate passages.

The end of the head 23 remote from the barrier 25 is threaded to receive a hollow cylindrical member 86, which is sealed against a shoulder in the head 23 by a gasket 87. The other end of the cylinder 86 is threaded to receive a plug 88 having a central hole through which passes a pipe 89. The pipe 89 is sealed within the cylinder 86 at the end of the plug 88 by a cap 91, which threads on a threaded extension of the plug 88 so as to squeeze a gasket 92 against the plug 88 and the wall of the pipe 89. Thus an annular channel 93 is formed between the inside wall of the cylinder 86 and the outside wall of the pipe 89. An inlet pipe 94 through the wall of the cylinder 86 communicates with this annular channel 93. The end of the pipe 89 within the head 23 is flared to encompass the focal region of high acoustic energy intensity in the neighborhood of the center of curvature of the electro-acoustic array. The pipe 89 may be adjusted longitudinally while the cap 91 is loose so that the flared portion has the desired close relationship to the region of most intensive acoustic activity.

An auxiliary inlet tube 96 passes through one side of the wall of the head 23 to the end of the head near the barrier 25, where it makes a U turn so that its end is near, and points into, the flared end of the pipe 89. Gasses entrapped within the head 23 may be bled out through a plugged hole 97. When the device is not in operation, the liquid may be drained from the head 23 through a plugged hole 98. Another plug 99 in the base 11 permits the liquid 21 to be drained from the interior of the housing for cleaning purposes.

In preparing the device shown in Fig. 1 for operation, the interior of the housing 19 is filled with the liquid 21 and the pumps 78 and 79 are set in operation. The pressure-regulating device 81 and the pressure relief valve 76 are adjusted for stable operation of the circulating system under the desired hydrostatic pressure. The liquid medium 21 entering through the fitting 68 is distributed within the space between the base 11 and the support 13, this space being enclosed within the gasket 71. The liquid then passes through the perforations in the support 13 to the barrier 25, where it reverses its direction of flow to return outside of the baffle 69 to the space 72 near the flange of the base 11 and thence out through the fitting 73. Circulation is continued for a sufficient length of time to permit the liquid 21 to be thoroughly degassed through the operation of the vacuum pump 78.

The material to be treated is fed through the pipe 94 and the annular space 93 into the interior of the head 23. The plug 97 may be removed until this material flows out, at which time the treatment head has been filled with liquid and the plug is replaced. The treated material flows out through the pipe 89, which has suitable outlet valves, not shown, to control the rate of flow.

This completes the course of flow of the material to be treated if the treatment is an operation affecting the course of chemical or biological processes in a single body of liquid. Similarly, the flow path just described is suitable for an operation, such as the sterilization or agglomeration of a single liquid or of a liquid dispersion, or if two liquids to be emulsified are pre-mixed and fed together through the inlet 94. In some emulsifying operations, however, it is preferable to introduce one of the liquids separately. As an example, an aqueous material may flow in through the tube 96 for mixing with an oily liquid introduced through the inlet pipe 94.

The ultrasonic frequency generator now is connected operatively to the elements 15, 16, etc. through the cable 61. Electrical energy is transduced into ultrasonic frequency acoustic energy originating at the electroded front surfaces of the array of elements, and the acoustic energy propagates toward the focal region and passes with little reflection or absorption through the barrier 25 when there is liquid on both sides of the barrier. This barrier may have a thickness equal to one half of the wave length of the ultrasonic energy at the chosen frequency, depending upon the velocity of propagation of the energy through the metal barrier. For a frequency of 100 kilocycles per second this thickness is about two thirds of an inch in brass. Such a half wave barrier sets up reflections of pressure waves without phase reversal at the first or liquid solid interface and with phase reversal at the second or solid-liquid interface. These two reflections remain out of phase and tend to cancel in the liquid medium 21 because the total round trip path between the two interfaces is one wave length. Therefore most of the energy radiated from the array passes through the wall portion 25 to the focal region. The curved shape of the wall 25 conforms to the direction of propagation of the wave fronts originating at the focusing array, so that the wall 25 has the same effect on the acoustic energy originating from each element of the array, and so that any energy reflected back is distributed over the entire array and not concentrated on one part of it.

At the frequency just mentioned, the electromechanically sensitive elements of barium titanate ceramic material exhibit length resonance when about three quarters of an inch long. Resonant operation ordinarily is desired to obtain the highest levels of acoustic energy and sensitivity. It is important that each of the elements 15, 16, etc. be resonant at the same frequency, since small deviations from resonance in either direction may cause serious phase shifts. Thus, if one element is driven slightly below and another element slightly above their resonant frequencies, the radiation from the two elements may in great part cancel.

It has been found to be important, moreover, that the several elements not only be of equal effective lengths but also be maintained at roughly the same temperature. This results from the fact that, at least within certain temperature ranges, various electromechanically sensitive materials exhibit substantial changes of the resonant frequency with changes in temperature of an element having given dimensions. Thus for example, if one group of elements becomes cooler than, and another group of elements becomes warmer than, the remaining elements, these two groups may be effectively detuned in different directions and this may upset seriously the focusing action of the array. Such effects may be paticularly troublesome if the apparatus is mounted with its axis horizontally, as in Fig. 1, due to the considerable vertical distance between the uppermost and lowermost elements. Dielectric losses in the elements cause the medium 21 to become heated, and hotter liquid tends to stratify in the upper portions of the housing near the uppermost elements while cooler liquid tends to fall toward the drain plug 99. This difficulty is avoided in the Fig. 1 arrangement by the forced circulation of the medium 21. Furthermore, for certain titanate-type ceramic elements, optimum operation occurs in the temperature range between room tmeperature and about 80° or 90° C. Accordingly, it is not always enough to maintain the temperature of the medium 21 uniform, and cooling water is circulated through the channel 83 to perform the additional function of maintaining all of the liquid cool enough so that the elements 15, 16, etc. do not become hotter than about 90° C. Barium titanate elements have additional advantages for resonant operation when the elements are at temperatures in the neighborhood of 70° C., since between 50° and 90° C. they exhibit only slight changes of resonant frequency with changes in temperature. In addition, these ceramic elements are less critical with respect to frequency than are some piezoelectric elements since the titanate-type elements in contact with liquids exhibit a somewhat less sharp resonance characteristic.

Referring again to the treatment head 23, it will be apparent that the concentric arrangement of the inflow and outflow paths of the material to be treated tends to direct the flow of this material steadily, expeditiously, and without the formation of stagnant pools of the material through the focal region within the flared end of the pipe 89. Since there is no other path for the material to travel except through this focal region, substantially all of the material is subjected to the acoustic energy in the focal region. The rate of flow of the material to be treated is adjusted until the desired effects of the treatment are obtained at about the highest possible rate of flow. In most cases this adjustment is such as to obtain cavitation in the liquid to be treated in a small region within the flared end of the pipe 89.

While both operations would be possible within a small treatment head, the advantages of an arrangement for continuous passage of material to be treated through a head such as the head 23 are obvious. A very wide variety of treatment operations is practical. Suspensions or dispersions, colloidal or otherwise, in fluid media may be treated. The functions of a colloid mill are performed more speedily and inexpensively. Very stable emulsions can be formed. The particles in a copper powder, as an example, may be disrupted and very finely dispersed in a liquid of low or high viscosity. Almost endless variations of such treatments are available to one skilled in the art of acoustic treatment using the device of the present invention.

The discussion hereinabove concerning the importance of a uniform natural resonant frequency for each radiating element illustrates the necessity of decoupling the electroded back surfaces of the array of elements from the supporting surface of the support member 13. The pressure-releasing material 54 between the surfaces provides an effectively free or unclamped acoustic termination for the backs of the elements. If it is attempted to mount or clamp the elements directly to a solid supporting structure, an effective distance approximately equal to the thickness of this structure is added to the length of each element provided the supporting surface is affixed firmly to the element at every minute portion of the back surface thereof. This is difficult to achieve, however, and very small areas improperly cemented or containing voids can have a profound effect on the resonant frequency of the element involved. This not only upsets the focal pattern but also may lead to destructive acoustic forces at the interface, particularly if the acoustic medium can penetrate behind the element.

Other deleterious effects which may result from attempting to couple each element acoustically to a single stiff backing or support arise from the lateral motion occurring in the elements by piezoelectric or elastic coupling to the longitudinal vibrations. This unwanted coupled lateral motion may cause losses in the dielectric or may cause drastic modifications of the resonant characteristics of the elements. If extremely large lateral dimensions, in terms of the wavelength in the electromechanically sensitive material, can be obtained, the effects of such lateral resonances on the response in the longitudinal mode may be avoided. However, for spherical radiating surfaces having areas of the order of, say, 70 square inches it may be impractical to fabricate a titanate bowl-shaped radiator in one piece. If it is attempted to make up the desired area using, for example, eight or a dozen separate radiators having concave surfaces, the lateral dimensions of each such element are likely to fall within the range in which unwanted resonances occur, since the lateral dimensions may be about three or four times the half-wave longitudinal or thickness dimension. These difficulties are avoided by making the lateral dimensions small compared with a half wave length, for example about a half inch maximum for barium titanate ceramic material at 100 kilocycles per second, and including a sufficient number of elements to obtain the desired radiating area. In the case of the device illustrated in Figs. 1 and 2, about 350 separate elements were used.

Figure 4:
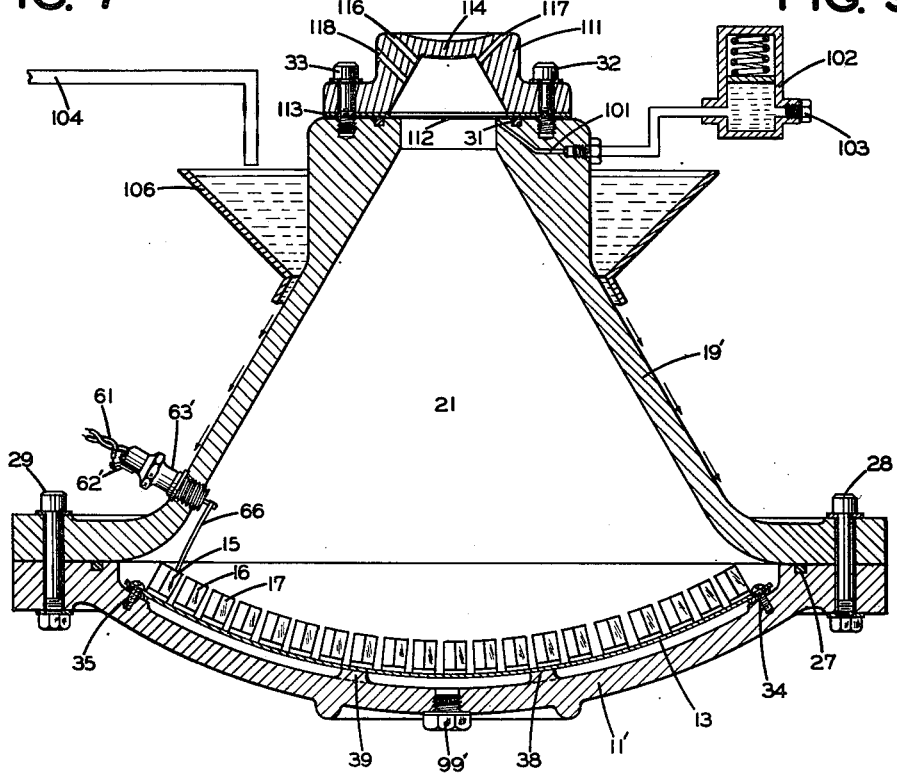
Fig. 4 is a sectional elevation of an alternative form of the electro-acoustic device of Fig. 1.

Referring now to the modified arrangement illustrated in Fig. 4, it is seen that the housing is similar to that shown in the Fig. 1 arrangement, except that the walls are thinner. Only somewhat elevated internal pressures are employed with the Fig. 4 device. Portions of this device which are the same as portions of the Fig. 1 device are indicated by the same reference numerals, while similar portions are indicated by the same reference numerals primed.

Thus, the Fig. 4 device has a base 11' and has a support 13, which is fastened to the base by screws 34, 35 at the periphery of the support and which is braced additionally by bosses 38, 39. The device further includes elements 15, 16, 17, etc., supported on the support 13 just as illustrated in Figs. 2 and 3 but with the elements filling the supporting surface to the extent that only a narrow margin is left free of the elements around the edge of the support. The housing 19' is fastened to the base 11' by bolts 28 and 29, and a gasket 27 makes the joint tight.

It will be noted particularly that the Fig. 4 device is illustrated for operation with its axis vertical rather than horizontal. The liquid medium 21 within the housing may be drained or filled through a plug 99' at the center of the base 11'. When the housing has been filled, the liquid medium passes through a channel 101 into an expansion or pressure chamber 102 having a plug 103. This pressure chamber has an internal volume which increases as the liquid 21 expands from heating during operation, and the increased volume may be made to cause the chamber 102 to exert a predetermined hydrostatic pressure on the medium 21. The liquid 21 is degassed before introduction into the housing 19', but any vapor which might develop within the housing during operation can be purged through the plug 103 in the chamber 102.

The cable 61 brings electrical energy to a lug 62' grounded to the housing 19' and also through a pressure-tight feed-through fitting 63' to the internal bus conductor 66.

During operation of the Fig. 4 device the liquid 21 is heated as a result of dissipation of energy within the dielectric material of the sensitive elements. This heating causes a convection flow to be set up within the liquid 21 from the warmer portions of the array upward and then back downward toward the cooler elements. This circulation is improved and made more effective for cooling the lower portions of the elements by virtue of the perforations in the support 13, since the circulating medium can pass through some of these perforations and then flow laterally in the space between the base 11' and the support 13 to emerge through other perforations in the neighborhood of the warmer elements. With the array in the vertical position illustrated the convection currents are facilitated, and any variations in temperature of the elements tend to be small and to be symmetrical with respect to the axis of the device, so that such variations have a negligible effect upon the focusing action of the array.

Undesirably high temperatures of the elements and hence of the medium 21 are avoided by introducing cooling water through a pipe 104 into a reservoir 106 surrounding the upper part of the conical housing 19'. A uniform narrow space is maintained between the bottom of the reservoir 106 and the outer wall of the housing 19' by suitable brackets, not visible in Fig. 4, and the cooling water flows downwardly through this space all around the housing. The cooling water flows smoothly down the outer surfaces of the housing 19', as indicated by the arrows in Fig. 4, and the water passes over the flange at the bottom of the housing 19' after it has served its purpose.

The treatment head and solid barrier in the Fig. 4 device are of different design from those illustrated in Fig. 1. The head 111 is fastened to the main portion of the housing 19' by bolts 32 and 33. A diaphragm 112 in the shape of a disk having a diameter equal to the outer diameter of the head 111 is interposed between the head and the housing proper. A gasket ring 31 insures a tight seal between the diaphragm and the housing, while a washer 113 forms a seal between the diaphragm and the head.

The focal region within the head is located just beneath the upper wall 114 of the head. This wall has a thickness equal to a quarter wave length for the material of the wall at the frequency of operation. For example, at 100 kilocycles per second this thickness is about one third of an inch for brass and about a half inch for aluminum. This makes the wall 114 an efficient reflector of acoustic energy and thus enhances the intensity of the energy in the space just below the wall 114 when the head 111 is filled with an acoustic medium. This medium in the form of a liquid material to be treated may be introduced through a duct 116 just to the left of the focal region and the treated material then is removed through a duct 117 just to the right of the focal region, as viewed in Fig. 4. This liquid material fills the space between the top 114 of the head and the diaphragm 112. The diaphragm may be of stainless steel about ten thousandths of an inch thick.

If it is desired to emulsify a small amount of one liquid in a large amount of another, the two liquids may be introduced separately. Thus a large amount of water may be introduced into the head through an auxiliary duct 118 entering the interior of the head well below the focal region. A relatively small amount of oil, introduced through the duct 116, floats on the water just beneath the top 114 until it is emulsified with the water, and the resulting emulsion is removed through the duct 117.

Alternative arrangements of the treatment head, suitable for substitution for the head 111 in the Fig. 4 device, are shown in Figs. 5–11, inclusive. Referring to the sectional view of Fig. 5, there may be seen the diaphragm 112, the sealing washer 113, and the head proper 111' having a reflecting quarter wave upper wall 114', an entrance duct 116, an exit duct 117, and an auxiliary entrance duct 118. The head 111' differs from the head 111, shown in Fig. 4, in that the quarter wave upper wall portion 114' is flat, whereas the wall 114 in Fig. 4 is curved to minimize any tendency of reflected energy which might pass through the treatment region to be concentrated through a limited area in the middle of the diaphragm 112. While the upper wall portion 114' of the head 111' is not curved, the lower surface of the wall 114' is corrugated by a number of channels 119, 120, etc. These channels run cross-wise of the direction of flow of the liquid material entering and leaving through the ducts 116 and 117. The wall portion 114' may be a quarter wave in thickness between the channels, while the channels themselves may have a depth about one tenth of this dimension.

Figure 5:
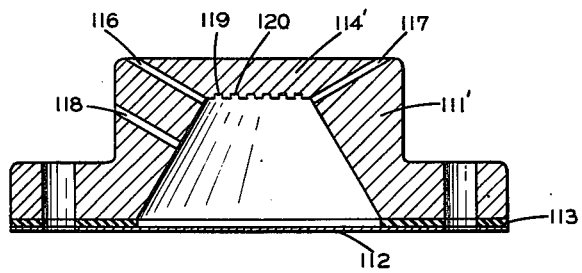
Fig. 5 is a sectional elevation of an alternative arrangement for the treatment head incorporated at the top of the device illustrated in Fig. 4.

In the operation of the Fig. 4 device when equipped with the head shown in Fig. 5, the liquid material being treated flows into and out of each corrugation, providing an elongated treatment path in the focal region. Any reflected energy which might penetrate back toward the radiator tends to be well scattered. This type of head is designed for use where the acoustic treatment occurs principally in a rather thin film of liquid; the corrugations 119, 120, etc. provide a larger effective surface for treatment of the liquid film.

Figure 7:
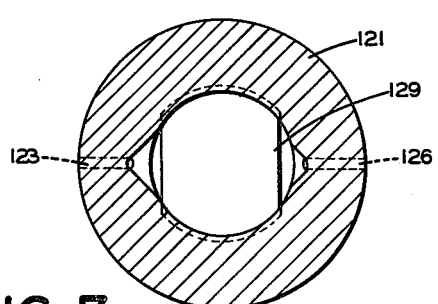
Figs. 6 and 7 are sectionalized elevation and plan views respectively of another form of treatment head which may be incorporated in the Fig. 4 device.
Figure 6:
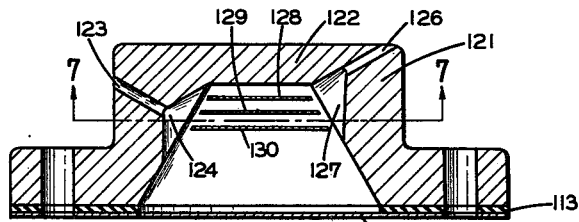

Figs. 6 and 7 are sectional views illustrating in elevation and plan respectively another type of treatment head 121. The view of Fig. 7 is taken in the direction indicated by the arrows 7, 7 in Fig. 6. The diaphragm 112 and washer 113 are the same as with the head 111 of Fig. 4. The head 121 has a flat upper wall 122 which is a quarter of a wave length in thickness. An inlet duct 123 for the material to be treated ends in a flared portion 124, which aids in distributing the material over the upper half of the interior of the head 121. An outlet duct 126 likewise has a flared entrance 127 for collecting the treated material from the upper half of the interior of the head. The acoustic energy passing to and reflected from the wall 122 also meets a group of thin baffle disks 128, 129, and 130, which have been pressed into grooves in the front and rear interior walls of the head. The material being treated passes not only between the wall 122 and the baffle 128, but also through the two spaces between the baffles and beneath the baffle 130.

The head arrangement of Figs. 6 and 7 affords four separate treatment areas, thus providing a greatly increased effective volume. This arrangement is designed for treatment of materials which do not require violent cavitation during treatment and which are to be treated in rather thin films. The baffle disks 128, 129, and 130 may be of stainless steel about five thousandths of an inch thick and separated by much less than a quarter wave length in the liquid to be treated. A suitable spacing of the disks at the frequency mentioned hereinabove is about an eighth of an inch for most liquids.

Figure 9:
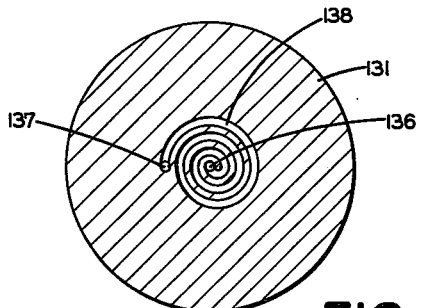
Figs. 8 and 9 are sectionalized elevation and plan views respectively of a further alternative arrangement of the treatment head.
Figure 8:
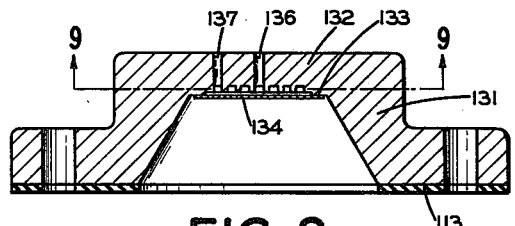

Figs. 8 and 9 show another alternative treatment head 131, Fig. 8 being a sectional elevation and Fig. 9 a sectional plan view taken in the direction indicated by the arrows 9, 9 in Fig. 8. In this case the baffle 112 and, if desired, the sealing ring 31 are omitted from the Fig. 4 assembly, leaving the washer 113 to seal the head 131 to the housing 19'. Again the head has a quarter wave upper wall 132. Around the edge of the interior surface this wall is a slightly raised ledge 133 against which is secured a diaphragm disk 134. The inlet and outlet ducts in this head pass vertically through the upper wall 132, one duct 136 at the center and the other duct 137 toward the edge of the wall 132. Between the lower ends of these ducts in a spiral groove 138 cut into the interior surface of the wall 132, a three turn spiral being shown. The material to be treated enters through either one of the ducts 136 and 137, flows around the spiral, and leaves through the other duct. The concentrated ultrasonic energy passes through the diaphragm 134 and effects treatment along the entire spiral course of flow.

Figure 10:
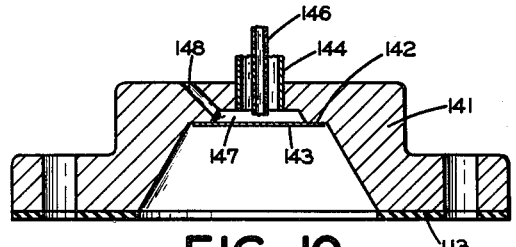
Figs. 10 and 11 represent still other forms of the treatment head.

An additional alternative form of the treatment head is illustrated in Fig. 10. In this figure also a head, designated 141, is fastened so that it opens directly into the casing 19' of Fig. 4 without the interposition of a diaphragm, sealing being obtained with the washer 113. Near the top of the treatment chamber a circular abutment 142 carries a small diaphragm 143. The head 141 resembles in some respects the head 23 of the Fig. 1 device, since the head 141 also has a concentric arrangement of an outer pipe 144 and an inner pipe 146 to permit concentric flow of the material to be treated while entering and leaving the head. Thus the material may flow through the annular space between the pipes 144 and 146 into a small region 147 above the diaphragm 143. In the region 147 the material is subjected to the concentrated acoustic energy in the focal region of the device. Thereafter the treated material leaves through the central pipe 146. An additional entrance duct 148 communicates from the side with the treatment region 147, permitting one liquid to be introduced through this duct and emulsified in the region 147 with another liquid introduced through the aforementioned annular space, between the pipes 144 and 146. The short, direct flow paths and the small size of the region 147 make possible rapid and complete treatment of the liquid or liquids entering the head 141.

Figure 11:
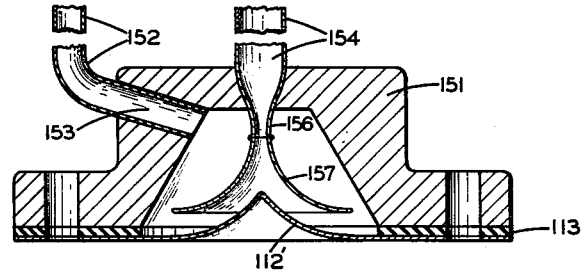

Still another type of treatment head is illustrated in Fig. 11. This head designated 151, also is designed to be substituted for head 111 of the Fig. 4 arrangement. A diaphragm 112' is inserted between the housing 19' and the washer 113. The diaphragm 112', however, bulges rather sharply upward toward the center of the head 151, as shown in Fig. 11.

Material to be treated in the head illustrated in Fig. 11 enters through a pipe, shown schematically at 152, connecting with an inlet duct 153 entering the upper part of the interior of the head 151. An outlet pipe 154 communicates with the interior of the head 151 through the center of the upper wall of the head and tapers toward a constricted throat 156 near the center of the head. To the bottom of this throat is brazed a widely flared continuation 157 of the outlet pipe 154. The flared member 157 conforms roughly to the configuration of the diaphragm 112', leaving a rather narrow space between the diaphragm and the inside of the flared structure 157.

Material to be treated in the head illustrated in Fig. 11 flows into the top of the head, down to the bottom of the interior space near the outer walls thereof, and thence between the diaphragm 112' and the flared structure 157. In the region near the throat 156 of the outlet pipe 154 the material is subjected to intensive acoustic irradiation while being confined closely to a small region of greatest energy concentration.

With reference to the operation of the Fig. 4 device when equipped with the head 151 of Fig. 11, the acoustic energy is transmitted into the liquid medium 21 which is within the housing 19' and in contact with the electro-acoustically responsive radiator or array mounted at the bottom of the housing. The diaphragm 112' constitutes a solid acoustic energy barrier remote from the radiator and separating the liquid medium 21 from the focal region within the treatment head. The pressure chamber 132 of the Fig. 4 arrangement may be adjusted to maintain the liquid 21 under a substantial hydrostatic pressure within the housing 19' and contiguous to the lower side of the barrier or diaphragm 112'. The arrangement of the head 151 of Fig. 11 constitutes a preferred form of means for directing a flow of a liquid material to be treated through a focal region of small volume so as to subject all of the material expeditiously to acoustic treatment.

The inlet and outlet pipes 152 and 154 are shown broken in Fig. 11 to indicate that they may extend vertically a substantial distance above the top of the head 151 in order to maintain the liquid material in the focal region and contiguous to the upper side of the diaphragm 112' under a substantial hydrostatic pressure. These provisions for maintaining hydrostatic pressure within the housing 19' proper and also within the treatment head result in increasing the level of acoustic energy intensity which may be attained without the flow of this energy being interrupted by excessive cavitation. Ordinarily the intensity, the pressures, and the rates of flow are adjusted to achieve cavitation only in a small region in the center of the head 151, near the throat 156 of the outflow pipe. Cavitation takes time to develop, and increasing the rate of flow of a liquid through a region of high acoustic energy intensity delays or avoids the onset of cavitation, particularly when the flow is in the same direction as the direction of propagation of the acoustic waves.

Figure 12:
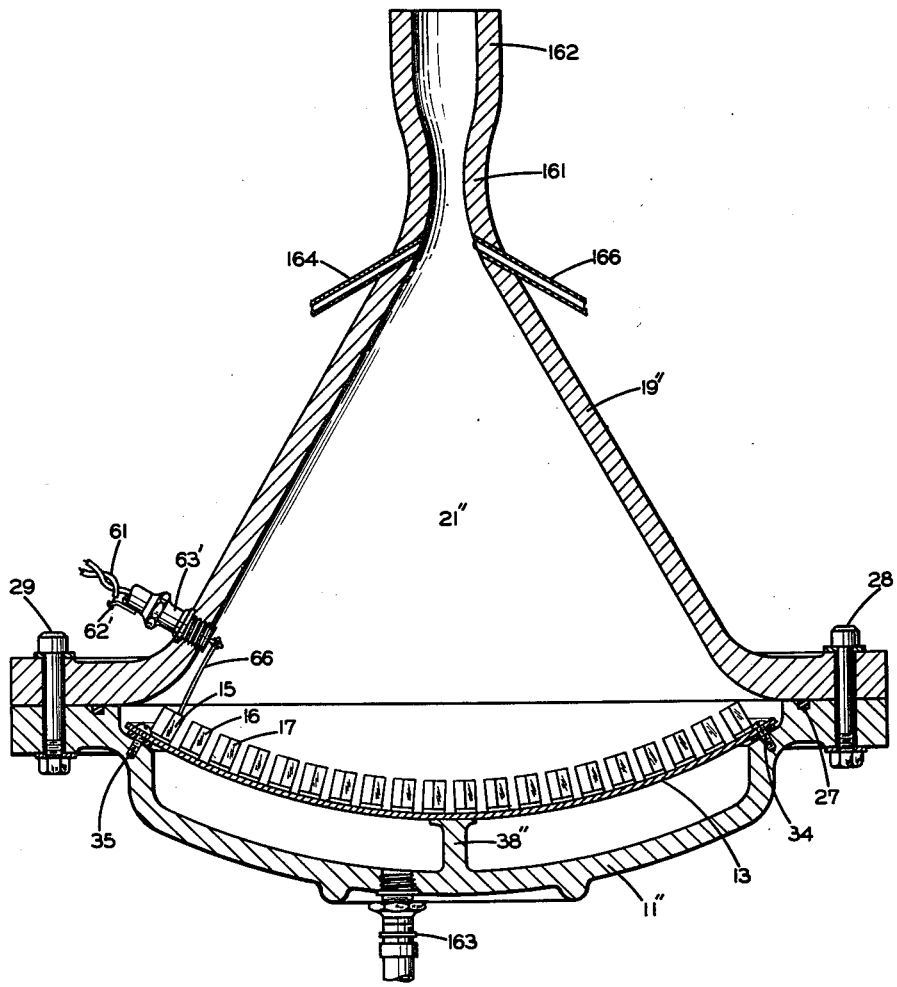
Fig. 12 is a sectional elevation of another embodiment of a focused acoustic device, alternative to the forms of electro-acoustic devices shown in Figs. 1 and 4.

Fig. 12 shows another form of the focused treatment device. As with the devices of Figs. 1 and 4, a base 11'' is provided for mounting a support member 13 at the edge thereof by means of the screws 34, 35. The base 11'', however, is more deeply recessed to provide a rather large clearance between the inside of the base and the support 13. A single centrally located boss 38'' helps to brace the support 13. The arrangement of the transducer itself is the same as in Fig. 4. Sensitive elements 15, 16, 17, etc. are fastened to the support 13. Electrical energy of acoustic frequencies at high power levels is introduced through a cable 61, of which one conductor is grounded to the lug 62' on the connector 63' and the other conductor passes through the connector to the internal bus 66.

A unitary housing and duct member 19'' has a generally conical shape with a flanged portion at the larger end which is fastened to the base 11'' by means of the bolts 28, 29. The compression ring 27 seals the joint. The smaller end of the housing 19'' has a rather narrow throat portion 161, and then broadens somewhat to form a duct portion 162 for receiving a suitable connector fitting, not shown, for handling the liquid to be treated. Another fitting 163 is provided near the center of the base 11''. Two small auxiliary inlet ducts 164 and 166 enter the housing 19'' near the constricted region 161.

Although illustrated with its axis vertical and with the electro-acoustically responsive array at the bottom, the Fig. 12 device may be used in other positions, notatably with its axis vertical but with the array at the top and the throat 161 at the bottom. The array, on the concave supporting surface of the support member 13, in the Fig. 12 device does not direct acoustic energy toward a predetermined focal region on the remote side of an acoustic-energy-transmitting wall portion such as the wall 25 of Fig. 1 or the diaphragms of the treatment heads in Figs. 4–11. Instead, in the device shown in Fig. 12, the array simply directs the acoustic energy toward a predetermined focal region within the open interior of the housing 19'' near the throat 161. Thus, the acoustic energy of high intensity in the focal region, instead of being transmitted through a wall or other barrier, passes without any barrier whatever through a liquid 21'' within the housing 19''. Undesirable internal reflections may be prevented by forming the housing 19" so that it tapers smoothly in cross-sectional area toward the constricted portion 161 bordering the focal region.

In the Fig. 12 arrangement the acoustic medium is itself the liquid to be treated. Means are provided communicating with the space between the base 11" and the support 13, for passing the liquid to be treated, for example an aqueous liquid, from the back surface of the support member 13 through the perforations therein, past the elements 15, 16, etc., and through the focal region within the constricted portion 161 of the housing 19", wherein acoustic energy translated from the array to the aqueous liquid in contact with the array is focused for high intensity acoustic treatment of the same liquid within the constricted portion 161 of the housing.

When an aqueous liquid is to be treated, it is advantageous to employ sensitive elements of the water-insoluble polycrystalline titanate-type material to avoid attack upon the elements by the liquid to be treated. With proper design it is practical to operate the Fig. 12 arrangement with the elements under water. An ultrasonic frequency of the order of 500 kilocycles per second is recommended. It is understood then that the elements will be correspondingly shorter and narrower to permit operation in longitudinal mode resonance without interfering resonances in other modes. The impedance of the elements, due to their very high permittivity, is so low that the shunting impedance of the aqueous material between the electrodes may be almost negligible. This combination of ability to withstand water, high electromechanical response, and low impedance make the titanate-type elements extraordinarily useful. A further advantage of the low impedance is that large amounts of power can be used to drive the elements and produce acoustic fields of high intensity without necessitating the application of high voltages. Voltages of the order of 100 volts R. M. S. ordinarily are sufficient with prepolarized barium titanate bodies.

While it is difficult to obtain effective waterproofing without bulky coverings, it may be desirable to decrease the shunting effect of an aqueous liquid on the array by applying coatings of plastic or other materials having high electrical resistance to the titanate-type elements and the lead conductors connected thereto. Any seepage of moisture through such a coating will not damage the water-insoluble elements, and the insulating properties of the coating will remain sufficiently unimpaired to permit the use of lower ultrasonic frequencies without intolerable shunting of the electric energy through the aqueous liquid around the array.

If desired the material may flow into the Fig. 12 device at the duct end 162 of the housing 19" and out through the fitting 163. It is preferred, however, to have the flow in the other direction, as described hereinabove. Substantial advantages also may accrue from directing the acoustic energy vertically downward, the apparatus being disposed with the throat 161 of the housing at the bottom of the device. With this disposition of the device heavy materials may be treated when only crudely suspended in a liquid medium. Any solid particles coming out of suspension, whether or not agglomerated during the treatment, must fall toward the treatment region near the throat 161 instead of settling around the radiating array. Furthermore, some treatment processes require the use of rather small quantities of liquid or solid materials which do not mix or dissolve in the main body of the liquid medium and which have chemical or physical properties which might cause damage to the transducer assembly. In such a case the injurious material may be introduced through the auxiliary ducts 164 and 166 near the throat 161. If such materials tend to settle downward, it is advantageous to use the Fig. 12 device in the inverted position, so that the injurious materials do not settle toward the array.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A focused acoustic treatment device comprising: electromechanical transducing means for directing acoustic energy from an electroacoustically responsive radiator of sizable area toward a focal region having high acoustic energy intensity, having a relatively small effective area, and having a correspondingly small volume; a liquid acoustic transmission medium in contact with said radiator; a solid acoustic-energy-transmitting barrier remote from said radiator and separating said liquid medium from said focal region; and means for directing a flow of a liquid material to be treated into said device and through said focal region of small volume and for maintaining said liquid material under a substantial hydrostatic pressure to subject substantially all of said material in said flow expeditiously to said acoustic energy of high intensity.

2. A focused acoustic treatment device comprising: electromechanical transducing means for directing acoustic energy from an electroacoustically responsive radiator of sizable area toward a focal region having high acoustic energy intensity, having a relatively small effective area, and having a correspondingly small volume; a liquid acoustic transmission medium in contact with said radiator; a housing for said radiator and said liquid medium; a solid acoustic-energy-transmitting barrier in said housing remote from said radiator and separating said liquid medium from said focal region; means for maintaining said liquid medium under a substantial hydrostatic pressure within said housing and contiguous to one side of said barrier; and means for directing a flow of a liquid material to be treated into said device and through said focal region of small volume and for maintaining said liquid material in said focal region and contiguous to the other side of said barrier under a substantial hydrostatic pressure to subject substantially all of said material in said flow expeditiously to said acoustic energy of high intensity.

3. An electromechanical device for transducing from electrical energy to acoustic energy propagating in a fluid acoustic medium comprising: a support member having a back surface and an opposed supporting surface and having numerous perforations therethrough; acoustic pressure-releasing means affixed on one side thereof to said supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for coupling to said fluid acoustic medium; and means, including electrodes adjacent to each of said elements and a system of leads connected to said electrodes, for applying electrical energy to said electro-acoustically responsive array; said transducing device being arranged for motion of said fluid acoustic medium from said back surface of said support member through said perforations and past said elements during operation of said device.

4. An electromechanical device for transducing from electrical energy to acoustic energy propagating in a fluid acoustic medium comprising: a support member having an electrically conductive back surface and an opposed supporting surface and having numerous perforations therethrough; acoustic pressure-releasing means affixed on one side thereof to said supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for coupling to said fluid acoustic medium; electrodes adjacent to said back surface and to said front surface of each of said elements; lead conductors passing through said perforations and connecting said conductive back surface of said support member with said electrodes adjacent to said back surfaces of said elements; lead means arranged in proximity to said front surfaces of said elements and interconnecting said electrodes adjacent to said front surfaces; and terminal-circuit means for applying electrical energy across said lead conductors and said lead means; said transducing device being arranged for motion of said fluid acoustic medium from said back surface of said support member through said perforations and past said elements during operation of said device.

5. An electromechanical device for transducing from electrical energy to acoustic energy propagating in a liquid acoustic medium comprising: a support member having a back surface and an opposed supporting surface and having numerous perforations therethrough; acoustic pressure-releasing means affixed on one side thereof to said supporting surface and having numerous openings at least partially aligned with said perforations; a plurality of electromechanically sensitive elements of polycrystalline titanate-type material, each having a back surface, affixed to said pressure-releasing means on the other side thereof, and a front surface, said front surfaces collectively forming an electro-acoustically responsive array for coupling to said liquid acoustic medium; and means, including electrodes adjacent to each of said elements and a system of leads connected to said electrodes, for applying electrical energy to said electro-acoustically responsive array; said transducing device being arranged for motion of said liquid acoustic medium from said back surface of said support member through said perforations and past said elements during operation of said device.

6. An electromechanical device for transducing from electrical energy to acoustic energy propagating in a liquid acoustic medium comprising: a support member having a back surface and an opposed supporting surface and having numerous perforations therethrough; acoustic pressure-releasing means affixed on one side thereof to said supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for coupling to said liquid acoustic medium; means, including electrodes adjacent to each of said elements and a system of leads connected to said electrodes, for applying electrical energy to said electro-acoustically responsive array; and means for maintaining said liquid medium, acoustically coupled to said array, under a substantial hydrostatic pressure; said transducing device being arranged for motion of said pressurized liquid acoustic medium from said back surface of said support member through said perforations and past said elements during operation of said device.

7. An electromechanical device for transducing from electrical energy to acoustic energy propagating in a liquid acoustic medium comprising: a support member having a back surface and an opposed supporting surface and having numerous perforations therethrough; acoustic pressure-releasing means affixed on one side thereof to said supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for coupling to said liquid acoustic medium; means, including electrodes adjacent to each of said elements and a system of leads connected to said electrodes, for applying electrical energy to said electro-acoustically responsive array; and means for degassing said liquid medium while acoustically coupled to said array during operation of said transducing device; said transducing device being arranged for motion of said liquid acoustic medium from said back surface of said support member through said perforations and past said elements during operation of said device.

8. An electromechanical device for transducing from electrical energy to acoustic energy propagating in a liquid acoustic medium comprising: a housing having a wall portion adapted to transmit acoustic energy; a support member affixed to said housing, having a back surface and an opposed supporting surface, and having numerous perforations therethrough; acoustic pressure-releasing means affixed on one side thereof to said supporting surface and having numerous opening at least partially aligned with said perforation; a plurality of electromechanically sensitive elements, each having a back surface, affixed to said pressure-releasing means on the other side thereof, and a front surface, said front surfaces collectively forming an electro-acoustically responsive array directed toward said acoustic-energy-transmitting wall portion; means, including electrodes adjacent to each of said elements and a system of leads connected to said electrodes, for applying electrical energy to said electro-acoustically responsive array; and liquid-guiding means for directing a flow of said liquid acoustic medium at a substantial velocity from said back surface of said support member through said perforations, past said elements within said housing toward said wall portion thereof, and thence generally laterally of said wall portion to establish a continuous acoustic path through said moving liquid medium between said array and said acoustic-energy-transmitting wall portion.

9. An electromechanical device for transducing from electrical energy to acoustic energy propagating in a liquid acoustic medium comprising: a housing having a wall portion adapted to transmit acoustic energy; a support member affixed to said housing, having a back surface and an opposed supporting surface, and having numerous perforations therethrough; acoustic pressure-releasing means affixed on one side thereof to said supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array directed toward said acoustic-energy-transmitting wall portion; means, including electrodes adjacent to each of said elements and a system of leads connected to said electrodes, for applying electrical energy to said electro-acoustically responsive array; liquid-guiding means for circulating said liquid acoustic medium at a substantial velocity from said back surface of said support member through said perforations, past said elements within said housing toward said wall portion thereof, and thence generally laterally of said wall portion and returning to said back surface of said support member; and means for maintaining said circulating liquid medium under a substantial hydrostatic pressure while between said array and said acoustic-energy-transmitting wall portion and for continuously degassing said liquid medium, whereby a continuous acoustic path is established through said pressurized, degassed moving liquid medium between said array and said wall portion.

10. A focused acoustic treatment device comprising: a housing having a wall portion adapted to transmit acoustic energy; a support member affixed to said housing, having a back surface and an opposed concave supporting surface, and having numerous perforations therethrough; acoustic pressure-releasing means affixed one one side thereof to said concave supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for directing acoustic energy toward a predetermined focal region on the remote side of said acoustic - energy - transmitting wall portion; means, including electrodes adjacent to each of said elements and a system of leads connected to said electrodes, for applying electrical energy to said electro-acoustically responsive array; a liquid acoustic transmission medium within said housing; liquid-guiding means for directing a flow of said liquid acoustic medium at a substantial velocity from said back surface of said support member through said perforations, past said elements within said housing toward said wall portion thereof, and thence generally laterally of said wall portion to establish a continuous acoustic path through said moving liquid medium between said array and said acoustic-energy-transmitting wall portion; and means for directing a flow of material to be treated into said device on said remote side of said wall portion and through said focal region to subject substantially all of said material in said flow expeditiously to acoustic energy of high intensity transmitted through said wall portion to said focal region.

11. A focused acoustic device for treating liquids comprising: a support member having a back surface and an opposed concave supporting surface and having numerous perforations therethrough; acoustic pressure-releasing means affixed on one side thereof to said concave supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for directing acoustic energy toward a predetermined focal region; means, including electrodes adjacent to each of said elements, for applying electrical energy to said electro-acoustically responsive array; a housing containing said support member and having a portion of constricted cross-sectional area bordering said focal region; and means for passing liquid to be treated from said back surface of said support member through said perforations, past said elements, and through said focal region within said constricted portion of said housing, wherein acoustic energy translated from said array to said liquid is focused for high intensity acoustic treatment of said liquid.

12. A focused acoustic device for treating liquids comprising: a support member having a back surface and an opposed concave supporting surface and having numerous perforations therethrough; acoustic pressure-releasing means affixed on one side thereof to said concave supporting surface and having numerous openings at least partially aligned with said perforations; a plurality of electromechanically sensitive elements, each having a back surface, affixed to said pressure-releasing means on the other side thereof, and a front surface, said front surfaces collectively forming an electro-acoustically responsive array for directing acoustic energy toward a predetermined focal region; means, including electrodes adjacent to each of said elements, for applying electrical energy to said electro-acoustically responsive array; a housing containing said support member and tapering in internal cross-sectional area toward a constricted portion bordering said focal region; and means for passing liquid to be treated from said back surface of said support member through said perforations, past said elements, and through said focal region within said constricted portion of said housing, wherein acoustic energy translated from said array to said liquid is focused for high intensity acoustic treatment of said liquid.

13. A focused acoustic device for treating liquids comprising: a support member having a back surface and an opposed concave supporting surface and having numerous perforations therethrough; acoustic pressure-releasing means affixed on one side thereof to said concave supporting surface and having numerous openings at least partially aligned with said perforations; a plurality of electromechanically sensitive elements of polycrystalline titanate-type material, each having a back surface, affixed to said pressure-releasing means on the other side thereof, and a front surface, said front surfaces collectively forming an electro-acoustically responsive array for directing acoustic energy toward a predetermined focal region; means, including electrodes adjacent to each of said elements, for applying electrical energy to said electro-acoustically responsive array; a housing containing said support member and having a portion of constricted cross-sectional area bordering said focal region; and means for passing liquid to be treated from said back surface of said support member through said perforations, past said elements, and through said focal region within said constricted portion of said housing, wherein acoustic energy translated from said array to said liquid is focused for high intensity acoustic treatment of said liquid.

14. A focused acoustic device for treating liquids comprising: a support member having a back surface and an opposed concave supporting surface and having numerous perforations therethrough; acoustic pressure-releasing means affixed on one side thereof to said concave supporting surface and having numerous openings at least partially aligned with said perforations; a plurality of electromechanically sensitive elements of water-insoluble polycrystalline titanate-type material, each having a back surface, affixed to said pressure-releasing means on the other side thereof, and a front surface, said front surfaces collectively forming an electro-acoustically responsive array for directing acoustic energy toward a predetermined focal region; means, including electrodes adjacent to each of said elements, for applying electrical energy to said electro-acoustically responsive array; a housing containing said support member and having a portion of constricted cross-sectional area bordering said focal region; and means for passing an aqueous liquid to be treated from said back surface of said support member through said perforations, past said elements, and through said focal region within said constricted portion of said housing, wherein acoustic energy translated from said array to said aqueous liquid in contact with said array is focused for high intensity acoustic treatment of said liquid within said constricted portion of said housing.

ALFRED L. W. WILLIAMS.

REFERENCES CITED

The following references are of record in the file of this patent:

UNITED STATES PATENTS

| Number | Name | Date |
| --- | --- | --- |
| 2,163,650 | Weaver | June 27, 1939 |
| 2,251,959 | Smith | Aug. 12, 1941 |
| 2,438,936 | Mason | Apr. 6, 1948 |
| 2,514,080 | Mason | July 4, 1950 |

FOREIGN PATENTS

| Number | Country | Date |
| --- | --- | --- |
| 654,673 | Germany | Dec. 24, 1937 |